US008490085B2

(12) United States Patent
Devaux (10) Patent No.: US 8,490,085 B2
(45) Date of Patent: Jul. 16, 2013

(54) METHODS AND SYSTEMS FOR CPU VIRTUALIZATION BY MAINTAINING A PLURALITY OF VIRTUAL PRIVILEGE LEVES IN A NON-PRIVILEGED MODE OF A PROCESSOR

(75) Inventor: Fabrice Devaux, Les Marches (FR)

(73) Assignee: VMware, Inc., Palo Alto, CA (US)

( * ) Notice: Subject to any disclaimer, the term of this patent is extended or adjusted under 35 U.S.C. 154(b) by 1476 days.

(21) Appl. No.: 11/661,879

(22) PCT Filed: Sep. 2, 2005

(86) PCT No.: PCT/FR2005/002196
§ 371 (c)(1),
(2), (4) Date: May 21, 2007

(87) PCT Pub. No.: WO2006/027488
PCT Pub. Date: Mar. 16, 2006

(65) Prior Publication Data
US 2007/0300219 A1     Dec. 27, 2007

(30) Foreign Application Priority Data
Sep. 3, 2004  (FR) ..................................... 04 09367

(51) Int. Cl.
*G06F 9/455*   (2006.01)
*G06F 9/44*    (2006.01)

(52) U.S. Cl.
USPC .............................................. 718/1; 712/220

(58) Field of Classification Search
USPC .............................................. 718/1; 712/220
See application file for complete search history.

(56) References Cited

U.S. PATENT DOCUMENTS

| 6,651,132 | B1 | 11/2003 | Traut |
| 6,748,592 | B1 | 6/2004 | Porter |
| 7,278,030 | B1 * | 10/2007 | Chen et al. ..................... 713/189 |
| 2005/0044301 | A1 * | 2/2005 | Vasilevsky et al. ............... 711/1 |
| 2006/0047959 | A1 * | 3/2006 | Morais .......................... 713/166 |

OTHER PUBLICATIONS

Shang Rong Tsai et al., "On the Architectural Support for Logical Machine Systems," Microprocessing and Microprogramming, Elsevier Science Publishers, BV., Amsterdam, The Netherlands, vol. 22, No. 2, Feb. 1, 1988, pp. 81-96.
Judith S. Hall et al., "Virtualizing the VAX Architecture," Computer Architecture News, Association for Computing Machinery, New York, United States, vol. 19, No. 3, May 1, 1991, pp. 380-389.
Samuel T. King et al., "Operating Sytem Support for Virtual Machines," Proceedings of the 2003 Usenix Technical Conference, Jun. 4, 2003, pp. 71-84.

* cited by examiner

*Primary Examiner* — Meng An
*Assistant Examiner* — Blake Kumabe (57) ABSTRACT

A method for running, on a processor in non-privileged mode, different computer programs P while, in a nominal mode, using privileged instructions including running a hypervisor program in privileged mode of the processor, the hypervisor program providing the computer programs P with services substantially equivalent to those available for running in privileged mode, source codes of the computer programs P being modified beforehand for replacing the privileged instructions with calls for services supplied by the hypervisor program, and the hypervisor program creates at least two privileged submodes organized into a hierarchy within the non-privileged mode and the processor includes only two operating modes.

15 Claims, 5 Drawing Sheets

Figure 1

PRIOR ART

Figure 2

PRIOR ART

METHODS AND SYSTEMS FOR CPU VIRTUALIZATION BY MAINTAINING A PLURALITY OF VIRTUAL PRIVILEGE LEVES IN A NON-PRIVILEGED MODE OF A PROCESSOR

RELATED APPLICATION

This is a §371 of International Application No. PCT/FR2005/002196, with an international filing date of Sep. 2, 2005 (WO 2006/027488 A1, published Mar. 16, 2006), which is based on French Patent Application No. 04/09367, filed Sep. 3, 2004.

TECHNICAL FIELD

The technology in this disclosure relates to the field of hardware/software interfacing in the world of computer science, more specifically, to virtualization of processors with two operating modes: a privileged mode and a non-privileged mode.

BACKGROUND

A virtualization method called "paravirtualization" is known from publication XEN 2002, University of CAMBRIDGE, Technical Report UCAM-CL-TR-553. This method uses modifications of OS source code to be virtualized to replace privileged instructions with calls for equivalent services supplier by a hypervisor. The hypervisor is run in the most privileged mode of the processor, while the virtualized OS are run in a less privileged mode than that of the hypervisor, and the processes managed by the virtualized OS are run in a less privileged mode than that of the OS. This is why this method can only be implemented on processors having at least three different privilege levels.

SUMMARY

This disclosure relates a method for running, on a processor in non-privileged mode, different computer programs P while, in a nominal mode, using privileged instructions including running a hypervisor program in privileged mode of the processor, the hypervisor program providing the computer programs P with services substantially equivalent to those available for running in privileged mode, source codes of the computer programs P being modified beforehand for replacing the privileged instructions with calls for services supplied by the hypervisor program, and the hypervisor program creates at least two privileged submodes organized into a hierarchy within the non-privileged mode and the processor includes only two operating modes.

BRIEF DESCRIPTION OF THE DRAWINGS

The disclosure will be understood better from reading the description, provided below for purely explanatory purposes, made in reference to the appended figures, wherein.

DETAILED DESCRIPTION

I enable paravirtualization to be performed on processors that initially only have two privilege levels, by providing methods that comprise sub-dividing the non-privileged level of the processor into several virtual privilege levels.

For this purpose, I provide methods for running, on a processor in non-privileged mode, different computer programs P while, in a nominal mode, making use of privileged instructions comprising running a hypervisor program in privileged mode of the processor, this hypervisor program providing the computer programs P with services equivalent to those available for running in privileged mode, the source codes of the computer programs P being modified beforehand for replacing the privileged instructions with calls for services supplied by the hypervisor program, characterized in that:

the hypervisor program creates at least two privileged submodes organized into a hierarchy within the non-privileged mode and in that the processor comprises only two operating modes.

At least one of the computer programs P may be an operating system (OS) $O_i$ intended for running at least one application program $A_{ij}$ operational under the $O_i$, the source codes of the OS $O_i$ having been previously modified to replace the privileged instructions with calls for the services supplied by the hypervisor program.

At least one of the computer programs P may be an application program $B_k$, the source codes of the application program $B_k$ having been previously modified to replace the privileged instructions with calls for the services supplied by the hypervisor program.

The computer programs P may comprise at least one operating system (OS) $O_i$ and at least one application program $A_{ij}$ operational under the $O_i$, as well as at least one application program $B_k$ comprising running a hypervisor program in the privileged mode of the processor, the hypervisor program supplying the OS $O_i$ and application programs $B_k$ with services equivalent to those available when running in privileged mode, the source codes of the OS $O_i$ and of the application programs $B_k$ having been previously modified to replace the privileged instructions with calls for the services supplied by the hypervisor program.

The application programs $A_{ij}$ may be operational in at least one of the submodes that are less privileged than that of the OS $O_i$ running them.

The OS $O_i$ may be operational in at least one of the submodes that are more privileged than that of the application programs $A_{ij}$ they run.

At least one of the application programs $A_{ij}$ may be an OS.

One of the OS may be a hypervisor program and supplies the OS it manages with less privileged submodes than its own submode.

The hypervisor may implement steps of adapting the virtual privilege levels (sub-modes) of the computer programs P during a system call in too low a privilege level.

The steps of adapting virtual privilege levels preferably include a step of switching from the former virtual privilege level $n_{anc}$ of a computer program $P_1$ to a new virtual privilege level $n_{nouv}$, and a step of transferring the running of the service corresponding to the system call for the corresponding system call manager to the new virtual privilege level.

The step of switching from the former level $n_{anc}$ to the new level $n_{nouv}$ sets up means of adapting accessibility to the memory pages for the new level $n_{nouv}$.

The processor may have a physical cache, the means for adapting accessibility to the memory pages comprise an invalidation list created for at least each of the virtual privilege levels $N_i$ of the virtual machine of the computer program $P_1$ except for the least-privileged level, the invalidation lists containing the translation entries used to translate the addresses of the corresponding virtual privilege level $N_i$, and the translation entries of the invalidation lists with privilege levels that are both lower than or equal to the former level $n_{anc}$ and at the same time strictly higher than the new level $n_{nouv}$ are invalidated, and the invalidation lists with privilege levels that are both lower than or equal to the level $n_{anc}$ and at the same time strictly higher than the level $n_{nouv}$ are emptied.

The means for adapting accessibility to the memory pages may comprise at least one subassembly associated with each virtual privilege level, the subassemblies grouping together the available translation entries to perform the translations at the virtual privilege level; and the invalidation list with privilege level $N_i$ is restricted to the subassembly with the same privilege level.

The processor has a physical cache, the means for adapting accessibility to the memory pages comprise at least one subassembly associated with each virtual privilege level, the subassemblies grouping together the available translation entries to perform the translations at the virtual privilege level, and the translation entries of the subassemblies with privilege levels that are both lower than or equal to the former level $n_{anc}$ and at the same time strictly higher than the new level $n_{nouv}$ are invalidated.

The processor may have a hardware system for identifying logical space, the former and new privilege levels ($n_{anc}$, $n_{nouv}$) are two contiguous levels and the means for adapting accessibility to the memory pages comprise the following:

a unique number NL allocated to every virtual logical space of a virtual machine, the number NL depending on the virtual machine and on the virtual logical space, a set of applied rules:
   i. for a translation T with a privilege level that is higher than or equal to the highest privilege level MAX among the new and former levels ($n_{anc}$, $n_{nouv}$) the translation T is defined as being local to the value of the logical space register NL of the virtual machine and of the current virtual logical space,
   ii. for a translation T with a privilege level that is lower than or equal to the lowest privilege level MIN among the new and former levels ($n_{anc}$, $n_{nouv}$) the translation T is defined as being global,
   iii. for a virtual machine with virtual privilege level that is lower than the privilege level MIN, the current value of the virtual logical space contained in hardware system for identifying logical space is the global number, the global number being common to all the virtual machines and different to all the local numbers,
   iv. for a virtual machine with virtual privilege level that is higher than the privilege level MAX, the current value of virtual logical space contained in the hardware system for identifying logical space is the number NL of the virtual machine and of the current virtual logical space,
   v. when changing the current virtual space, all the TLB entries performing global translations are invalidated,
   vi. when changing the virtual machine in the hypervisor, all the TLB entries performing global translations are invalidated.

The step (iv) may also comprise a step of invalidating the translation entries local to NL when the number NL has at least one synonym.

The processor may use at least one logical cache and the step (iv) also comprises a step of invalidating the logical cache entries corresponding to the invalidated translation entries.

The processor may use at least one logical cache and the steps (v) and (vi) also comprise a step of invalidating the logical cache entries corresponding to the global translations and contained in the logical caches.

The processor may have a physical cache and the means of adapting accessibility to the memory pages may comprise the following:

a unique number NL assigned to every virtual logical space of a virtual machine in a given virtual privilege level, the number NL depending on the virtual machine, the virtual logical space and the virtual privilege level, a set of applied rules:
   i. for every change, whether of the virtual machine, the virtual logical space or the virtual privilege level, the new value NL is assigned as current virtual space value,
   ii. all translations are performed locally at each current value NL,
   iii. if the new assigned value NL has at least one synonym, then all the translation entries local to NL are invalidated.

Figure 1:
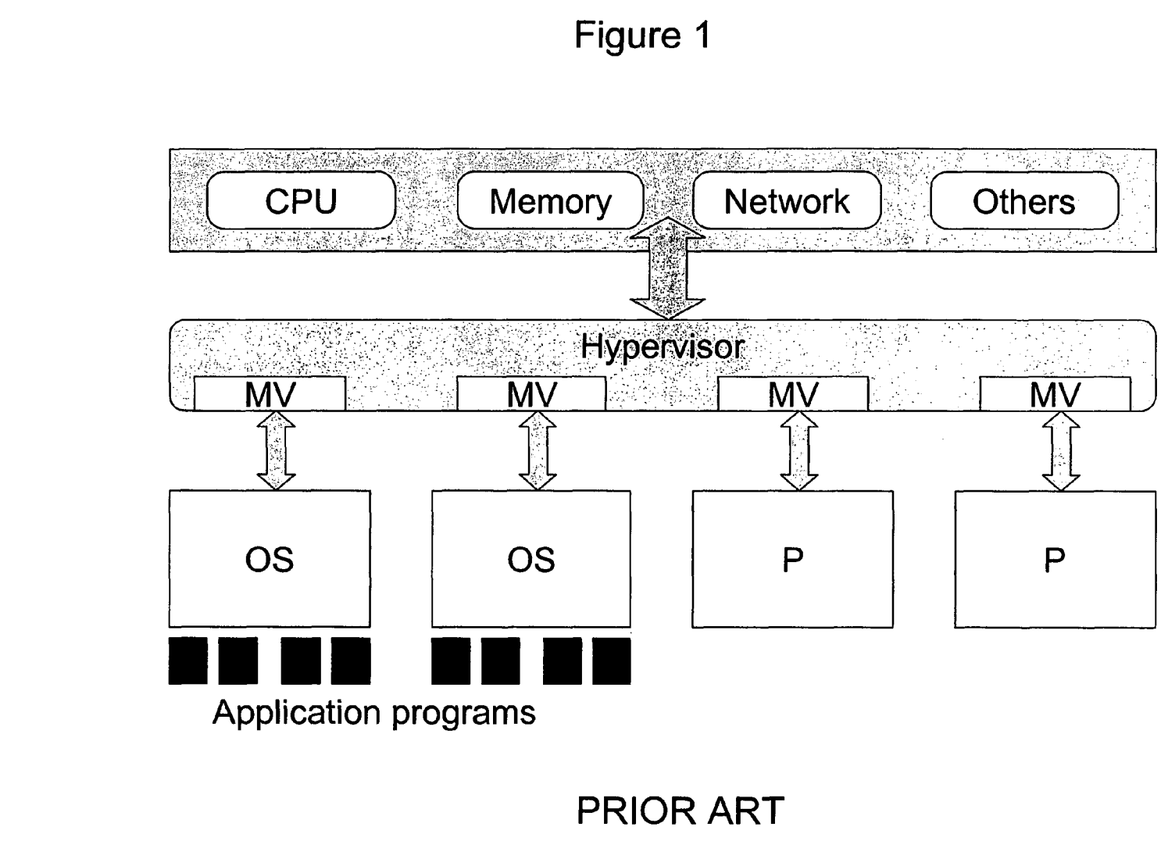
FIG. 1 shows a system of the prior art based on a hypervisor.
Figure 2:
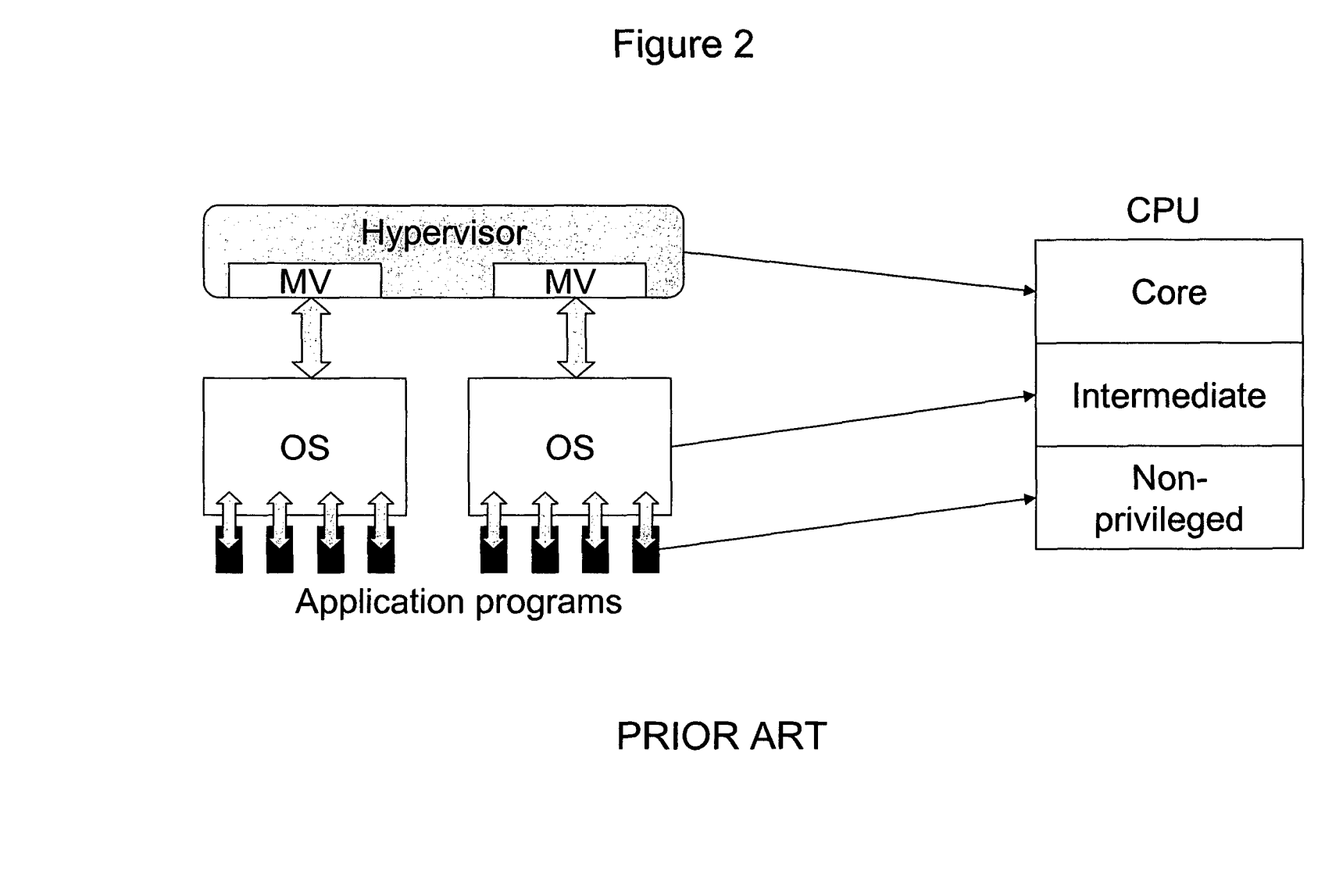
FIG. 2 shows a system of the prior art using a processor having three different privilege levels.

Turning now to the drawings, FIGS. 1 and 2 show a system according to publication XEN 2002 which describes the use of a hypervisor in the most privileged mode of the processor (Core). The virtualized operating systems on the hypervisor perform calls for the hypervisor in a privilege mode that is lower than that of the hypervisor (in the case of FIG. 2, the intermediate mode) and the processes (1) managed by the operating systems are run in an even less privileged mode than that of the operating systems (non-privileged mode).

I provide methods of paravirtualization on a processor initially having two privilege modes: a privileged mode of the processor and a non-privileged mode of the processor.

A program, called "hypervisor program," is run in the privileged mode of the processor. The hypervisor manages the virtual machines $MV_i$, each virtual machine being associated with a computer program $P_i$ run in non-privileged mode of the processor. A virtual machine $MV_i$ is a context grouping together accesses to the system resources as well as the status of the hardware registers of the processor for a single computer program $P_i$. When the hypervisor switches from running one computer program to another, the data (such as the privilege level, the processor registers) of the virtual machine associated with the former program are saved while the context of the new program is restored as system parameters.

The programs $P_i$ may be operating systems in which at least one application program is run.

A program $P_i$ may be a hypervisor supplying the "sub-programs" it manages with various privilege modes organized into a hierarchy, which are lower than its own submode, and implementing the method.

Figure 3:
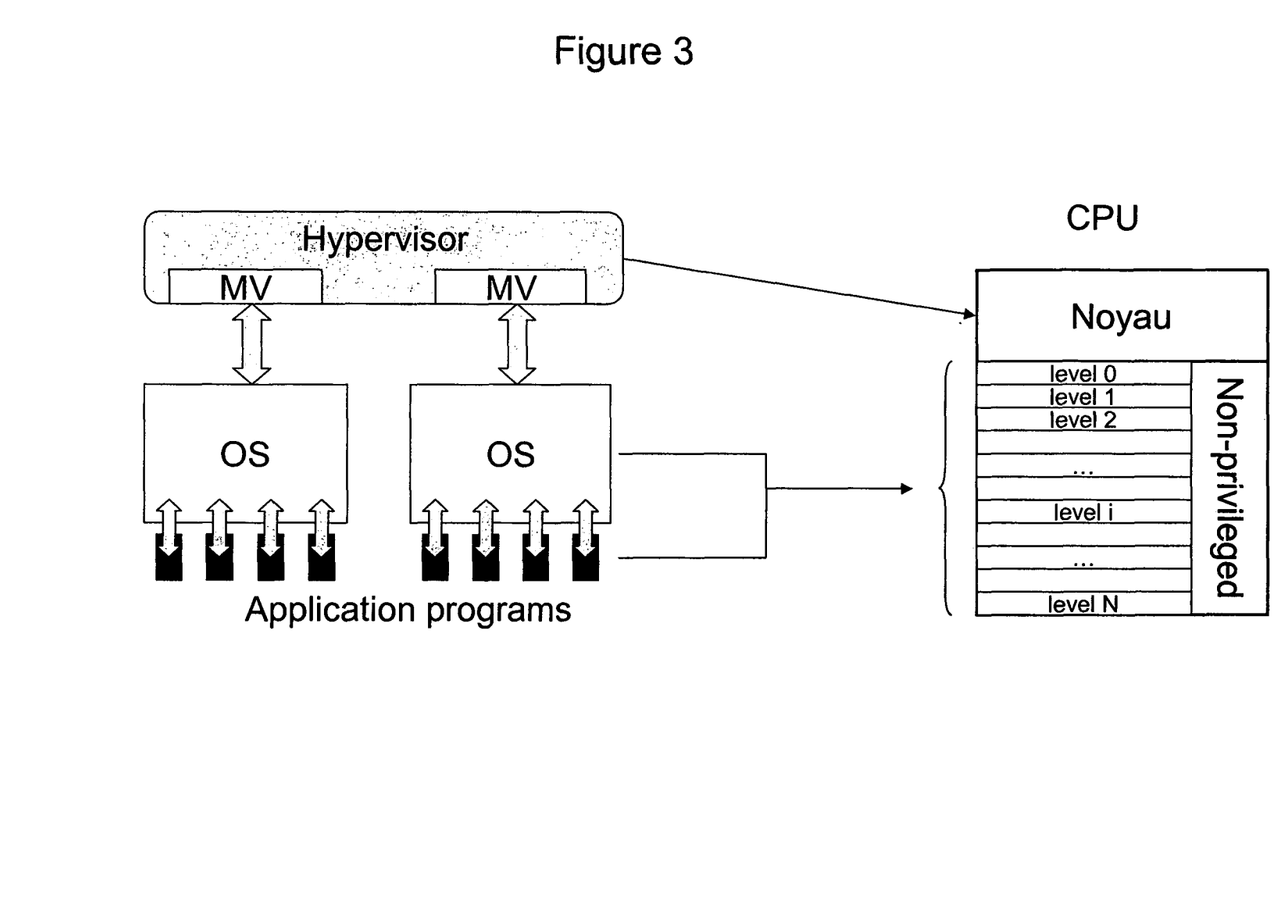
FIG. 3 shows a structural diagram of the use of a lower privilege level of the processor.

For each of the virtual machines $MV_i$, the hypervisor supplies $N_i$ submodes or virtual privilege levels and $M_i$ virtual addressing spaces as well as a certain number of services, accessible by means of system calls. As shown in FIG. 3, these $N_i$ virtual privilege levels can, for example, be characterized by integers.

The computer programs $P_i$ that already exist and are operational on the virtual machines are adapted to be able to call the services supplied by the hypervisor. This adaptation is carried out by a modification of the source codes of the programs $P_i$ to replace the privileged instructions with calls for the services supplied by the hypervisor. In this way, the programs $P_i$ have indirect, secure access to the privileged instructions of the system even when they themselves are in the non-privileged mode of the processor.

The $N_i$ virtual privilege levels of a virtual machine $MV_i$ are organized into a hierarchy, from the most privileged level to the least privileged level.

When a program $P_i$ associated with a virtual machine $MV_i$, the program $P_i$ being run in a given virtual privilege level $n_i$, performs a system call, the system call manager of the hypervisor is called in the privileged mode of the processor. This can be a system call generated by the actual program $P_i$ or resulting from an application program run in the program $P_i$ when the latter is an operating system.

The system call manager the verifies the virtual privilege level $n_i$ in which the system call was performed. Either the virtual privilege level is high enough to perform the system call and the hypervisor runs the service corresponding to the system call and then resumes the running of $P_i$, or the virtual privilege level is not high enough to run the service corresponding to the system call and the hypervisor changes the virtual privilege level $n_i$ to a higher virtual privilege level, and then transfers the running of the service, in the non-privileged mode of the processor, to the system call manager, corresponding to the new virtual privilege level of the program $P_i$. Specifically, the hypervisor has a variable in which the privilege level of the active computer program $P_i$ is stored. To change the privilege level, the hypervisor modifies this value by a value resulting from all the privilege levels $N_i$ assigned to the virtual machine.

For every virtual machine, the hypervisor supplies a service, which can only be accessed from a certain virtual privilege level, called "virtual space switching service." This indicates the current virtual addressing space, the reading of instructions, the reading of the operands of the instructions, as well as the writing of their results, always being performed from the current virtual addressing space.

The accessibility of a virtual space depends on the virtual privilege level. The virtual space is entirely accessible from the highest virtual privilege level, while its accessibility can be restricted from lower virtual privilege levels. In addition, a virtual space that can be accessed from a given privilege level $n_i$ is also accessible from all the privilege levels higher than $n_i$.

Virtual space management is carried out by a memory management unit MMU what comprises translation entries. These translations correspond to an association between a virtual space page and a physical memory page of the same size.

The hypervisor controls the MMU and, by doing so, supplies the virtual machines $MV_i$ with the services, called translation services, that make it possible to perform a translation.

When calling a translation service, the caller program specifies the virtual privilege level $n_i$ after which the page is accessible, the resulting translation being associated with the virtual privilege level $n_i$. The specified privilege level cannot exceed the virtual privilege level in which the translation service is called.

Before correctly programming a translation entry in the MMU, the translation services verify, among others, that the requested translation is not at risk of compromising the integrity of the hypervisor or of other virtual machines.

Typically, but not exclusively, a program $P_i$ will call the translation services of the hypervisor, during an "absent translation" event. Such an event takes place when none of the TLB translation entries indicate what physical address is associated with the virtual address generated during an access.

This event is processed initially by the hypervisor, according to the virtual privilege level in which the access was attempted and according to the address of the access; either the hypervisor directly processes the event, or it redirects the running of the event, in non-privileged mode of the processor, but with a higher-level virtual privilege, towards a routine of $P_i$ dedicated to processing this event. Since the routine can be chosen from among several routines depending, for example, on the virtual privilege level in which access was attempted, the routine is capable, by means of the translation services, of correcting the event and then re-running the instruction that caused it. Thus, the virtual privilege level of the program $P_i$ is increased until it is high enough for the process to be performed.

When the translations are managed as the "absent translation" events takes place, this translation management is called "on request".

The change from one privilege level to another of a program $P_i$ by means of the services supplied by the hypervisor requires for the accessibility of the memory pages to be adapted according to the new privilege level. It is possible to distinguish between three particularly advantageous embodiments.

The processor of the system may have physical caches, which is to say that the cache works with physical addresses. When accessing the memory, the address is translated by the memory management unit MMU before being presented to the cache.

When a translation service established a virtual privilege $n_i$ translation, by means of a $TLB_\alpha$ translation entry, it registers the index $\alpha$ of the translation entry in a list corresponding to this virtual privilege level $n_i$, called invalidation list $n_i$. Every privilege level, except for the lowest level, has an invalidation list.

If this index has already been registered in any of the invalidation lists $n_k$, then it is removed from the latter and added to the invalidation list $n_i$, the translation entry index then only being listed once in all the invalidation lists.

When a program $P_i$ with a virtual privilege level $n_i$ lowers, by means of a system call for the hypervisor, its virtual privilege level to the virtual privilege level nj, the hypervisor invalidates all the translation entries contained in the invalidation lists that correspond to the privilege levels ($n_i$, $n_j+1$), which is to say from privilege level $n_i$ to that immediately above $n_j$, and then resets these invalidation lists to empty them. The invalidation of a translation entry means that the translation that it performs is no longer known, and that a memory access requiring the translation will generate an absent translation event.

No actions are performed on the invalidation list $n_j$, which explains why no invalidation list is required for the lowest privilege level.

The available TLB translation entries may be distributed into several subassemblies, each subassembly being associated with a given virtual privilege level $n_i$. A virtual privilege level $n_i$ translation is performed by means of a translation entry chosen from the subassembly associated with this virtual privilege level $n_i$.

When a program $P_i$ with a virtual privilege level $n_i$ lowers its virtual privilege level to the virtual privilege level $n_j$, the hypervisor invalidates all the translation entries of the subassemblies corresponding to the virtual privilege levels ($n_i$, $n_j+1$), which is to say from the privilege level $n_i$ to that immediately above $n_j$.

The invalidation list associated with the virtual privilege level $n_i$, such as described above, may optionally only contain translation entry indexes of the subassembly associated with this same virtual privilege level $n_i$, as described above. The invalidation list with privilege level $n_i$ is the to be restricted to the subassembly with the same privilege level.

The processor may have a hardware system for identifying logical space. A hardware system for identifying logical space reduces the MMU invalidations on physical or logical cache processors and the cache invalidations on logical cache processors.

The logical space identification number, which is assigned by the hypervisor to each logical space used by a process, is contained in a hardware register associated with the processor, called "current logical space register," which can only be accessed in privileged mode of the processor, and therefore only by the hypervisor.

Figure 4:
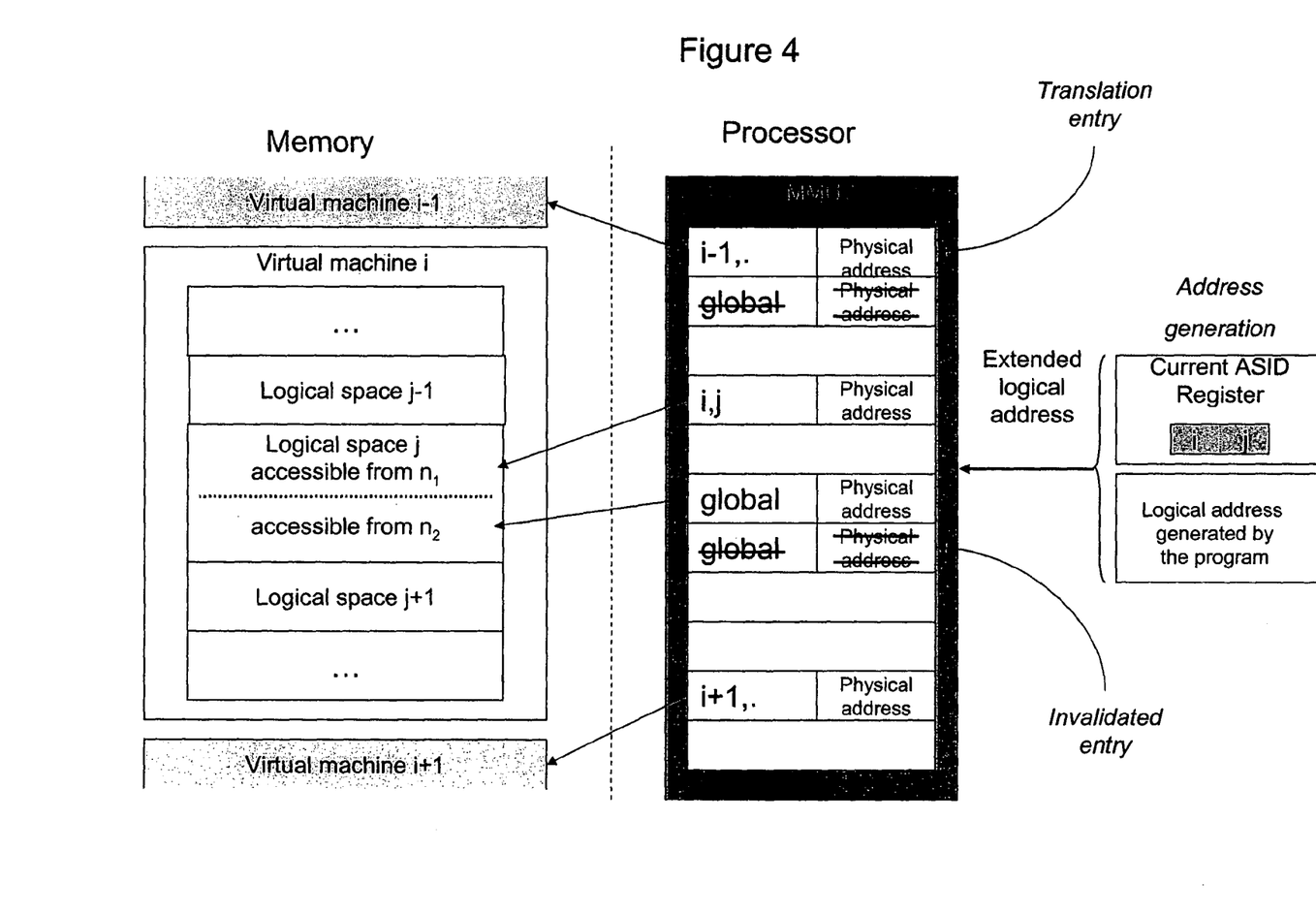
FIGS. 4 and 5 show the management of access to the memory pages.

As shown in FIG. 4, the contents of the current logical space register prefix the logical addresses generated by a program. The resulting extended addresses are used by the MMU and by the logical caches instead of the initial logical addresses.

In the MMU, each $TLB_i$ translation entry contains an additional field that indicates the value of the current logical space register for which the translation is valid.

In addition, for each $TLB_i$ translation entry, a mechanism, for example, for setting an activation or deactivation bit, makes it possible to indicate:
  whether the value of this field must be ignored, in which case the validity of the translation is independent from the value of the current logical space register, and the translation is called global,
  whether the value of this field must be used, in which case the validity of the translation depends on the value of the current logical space register, and the translation is called local.

By way of example, in the majority of current systems where it is not necessary to create virtual privilege levels, the hardware system for identifying logical space allows direct implementation of virtual logical spaces by assigning an identification number to each of these spaces.

The hypervisor may assign a value to the current logical space register from among the possible values. This value, called the "global number," is common to all the virtual machines $MV_i$.

Of all the possible values of the current logical space register, taken from the global number, the hypervisor exclusively assigns a number to every virtual logical space of every virtual machine. $NL(i, j)$ represents the number assigned to the virtual logical space j of the virtual machine $MV_i$. The global number is therefore unique and distinct from all the numbers $NL(i,j)$ assigned by the hypervisor to the various logical spaces.

When all the possible values have been used, exclusive assignment of a number is no longer possible. A number $NL(u, v)$, which has been already used, is then assigned to a virtual logical space v of a virtual machine $MV_u$. In this case, $NL(i, j)=NL(u, v)$ and $NL(i, j)$ and $NL(u, v)$ are called synonyms.

The mechanism for managing the memory during a transition between two privilege levels $n_1$ and $n_2$, where $n_1$ is the level immediately above $n_2$, requested following a system call for the hypervisor, is governed by the following steps, which apply to the numbers $NL(i, j)$ of virtual logical spaces of the virtual machines:
  i. When a translation service is called, either the privilege level of the requested translation is higher than or equal to $n_1$, in which case the translation is defined as being local to $NL(i, j)$, or the virtual privilege level of the requested translation is lower than or equal to $n_2$, in which case the translation is defined as being global.
  ii. When the virtual machine $MV_i$ has a virtual privilege level n that is lower than or equal to the privilege level $n_2$, then the register of the current logical space number takes the value of the global number (common space).

In this way, the memory pages of an invalidation list accessible from level $n_2$ and translated by the MMU are visible regardless of the value of the current logical space number. Since the global number is never used to perform a local translation, the current logical space register being set to the value of the global number guarantees that it will never be possible to access, inadvertently, a locally translated page (and reserved to the translations visible from $n_1$), or privileged-level translations of other virtual machines.
  iii. When the virtual machine $MV_i$, having as its current virtual space the virtual space j, has a virtual privilege level n higher than or equal to the privilege level $n_1$, the current logical space register takes the value $NL(i, j)$. If this value has at least one synonym, then all the local translation entries of this value are invalidated and, for processors having logical caches, the corresponding invalidations are performed.

Indeed, it is not necessary to invalidate the translation entries not affected by this synonym. Every time a value NL that has synonyms is loaded in the current space register, it is necessary to invalidate the entries that are local to the value NL because, otherwise, the pages would be visible from other virtual machines, other logical spaces or other virtual privileges.

In the absence of synonyms, this rule ensures the visibility of all the invalidation list pages translated by the MMU, which are only visible from $n_1$. The presence of synonyms is managed quite suddenly by a mass invalidation of the entries that use the synonym corresponding to the new value loaded in the current space register, resulting in a loss of performance, but not causing a breach of security or inconsistency. The advantage of the invention can be seen during transitions of virtual privilege levels, of virtual spaces or of virtual machines among non-synonyms.
  iv. When the current virtual space changes, all the TLB entries performing global translations are invalidated. For processors using logical caches, the entries in these caches correspond to global translations that must be similarly invalidated.

According to this rule, the hypervisor prevents the global memory pages of the former current virtual space from becoming accessible from the new virtual space.
  v. When the hypervisor switches from running one virtual machine to another, all the TLB entries performing global translations must be invalidated. For processors using logical caches, the entries which correspond to global translations and are contained in these caches must be similarly invalidated.

This makes it possible to prevent the memory pages of a virtual machine from becoming accessible to the processes of a new virtual machine.

The mechanism described by these rules makes it possible effectively to manage the transitions between two adjacent privilege levels.

Thus, a transition from one virtual privilege level no to a virtual privilege level $n_3$, where $n_0$ has a higher privilege than $n_1$, $n_3$ has a lower privilege than $n_2$, and $n_1$ and $n_2$ are as described above, can be broken down as follows:
  a transition from $n_0$ to $n_1$;
  a transition from $n_1$ to $n_2$; and
  a transition from $n_2$ to $n_3$.

If the mechanism is used to manage the transitions between $n_1$ and $n_2$, then other mechanisms must be used to manage the transitions from $n_0$ to $n_1$ and the transitions from $n_2$ to $n_3$.

In practice, as regards the most common cases of paravirtualization where it is only necessary to create two virtual privilege levels, this mechanism is sufficient.

Figure 5:
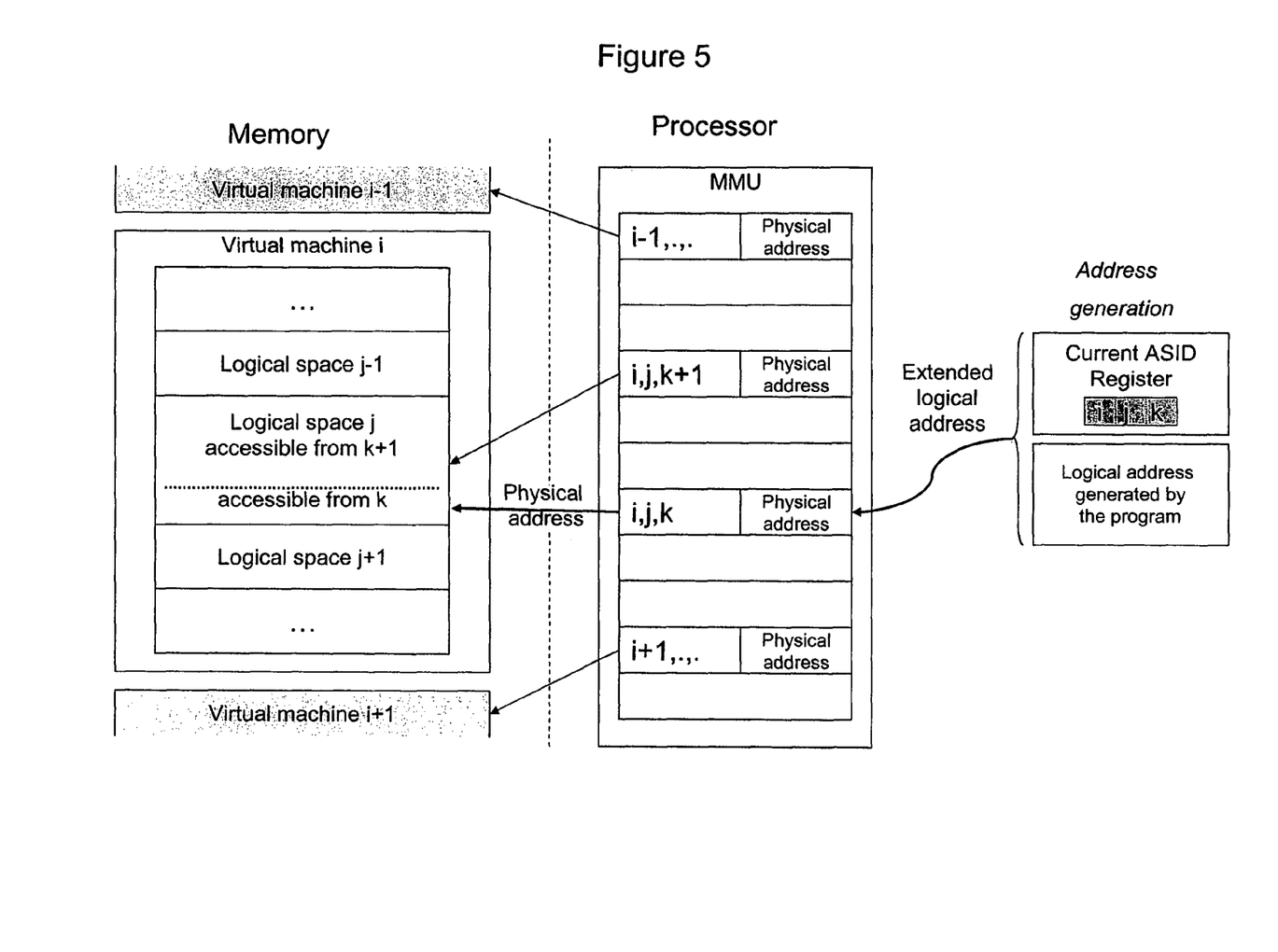

As shown in FIG. 5, the processor may have a hardware system for identifying logical space as well as physical caches.

For every virtual machine $MV_i$ having $N_i$ privilege levels and $M_i$ virtual spaces, $N_i \times M_i$ different values of logical space identifiers are chosen. NL(i,j,k) represents the logical space identifier that corresponds to the virtual machine $MV_i$, having current virtual space j, and to the virtual privilege level k.

During a change affecting either the virtual machine, the privilege level of the virtual machine, or the current virtual space of the virtual machine, the new value NL(i, j, k) is written in the current space identifier register.

When a translation service is called (during a system call for memory access), the translation is always performed locally to the current value of NL(i,j,k).

A memory page which can be accessed from $N_i$ virtual privilege levels and $M_i$ virtual addressing spaces can possibly have up to $N_i \times M_i$ translation entries positioned so that the page is accessible from $N_i$ virtual privilege levels and from the $M_i$ virtual addressing spaces. In practice, translation management is provided on request. The number of translation entries is, on average, much lower than the theoretical $N_i \times M_i$.

Synonyms can exist together with this mechanism and synonym management as described above applies. That is to say, in the case of synonymy, all the translation entries local to the value contained in the current logical space register are invalidated.

This configuration necessarily uses physical cache processors. This obligation results from the fact that several translation entries can designate the same physical page referred to as alias phenomenon. Yet, the logical caches become inconsistent, which it to say that they do not work properly, in the presence of alias.

The configurations described above are by way of example. It is understood that those skilled in the art will be capable of producing different variations without departing from the scope of the appended claims.

The invention claimed is:

1. A method for CPU virtualization, comprising:
running a hypervisor program in a privileged mode of a processor, wherein the hypervisor program is configured to maintain a plurality of virtual privilege levels that are operable in a non-privileged mode of the processor and are organized into a hierarchy of levels;
maintaining invalidation lists corresponding to the plurality of virtual privilege levels, wherein each of the invalidation lists is configured to store translation entries that are associated with a virtual address space corresponding to one of the plurality of virtual privilege levels;
running, in the non-privileged mode of the processor, an application program on an operating system within a virtual machine supported by the hypervisor program, wherein the application program is associated with a first virtual privilege level selected from the plurality of virtual privilege levels;
receiving, by the hypervisor program, a first call from the operating system relating to a request by the application program to the operating system to execute a privileged instruction that requires a more privileged level than the first virtual privilege level;
responding by the hypervisor program to the first call from the operating system by associating the privileged instruction with a second virtual privilege level selected from the plurality of virtual privileged levels and corresponding to the more privileged level, wherein associating the privileged instruction with the second virtual privilege level includes removing the translation entries in those invalidation lists that correspond to those of the plurality of virtual privilege levels that are not the second virtual privilege level; and
executing, by the hypervisor program, the privileged instruction associated with the second virtual privilege level in the operating system.

2. The method according to claim 1, wherein the operating system is paravirtualized to transmit the first call to the hypervisor program upon receiving the privileged instruction.

3. The method according to claim 1, wherein the first call specifies the first virtual privilege level.

4. The method according to claim 1, further comprising:
returning execution control to the operating system running in the non-privileged mode of the processor;
receiving, by the hypervisor program, a second call from the operating system to execute the privileged instruction, wherein the second call specifies the second virtual privilege level;
responding, by the hypervisor program, to the second call by processing the privileged instruction upon verifying that the second virtual privilege level is high enough for the privileged instruction.

5. The method according to claim 1, wherein associating the privileged instruction with the second virtual privilege level comprises
providing a processing of the privileged instruction with access to memory pages of a virtual address space accessible by the second virtual privilege level.

6. The method according to claim 5, wherein associating the privileged instruction with the second virtual privilege level further comprises
adding a set of translation entries associated with the memory pages to an invalidation list corresponding to the second virtual privilege level.

7. A method for CPU virtualization, comprising:
running a hypervisor program in a privileged mode of a processor, wherein the hypervisor program is configured to maintain a plurality of virtual privilege levels that are operable in a non-privileged mode of the processor and are organized into a hierarchy of levels;
maintaining invalidation lists corresponding to the plurality of virtual privilege levels, wherein each of the invalidation lists is configured to store translation entries that are associated with a virtual address space corresponding to one of the plurality of virtual privilege levels;
running, in the non-privileged mode of the processor, an application program on an operating system within a first virtual machine supported by the hypervisor program, wherein the application program is associated with a first virtual privilege level selected from the plurality of virtual privilege levels;
receiving, by the hypervisor program, a call from the operating system relating to a request by the application program to the operating system to execute a privileged instruction that requires a less privileged level than the first virtual privilege level; and
responding by the hypervisor program to the call from the operating system by associating the privileged instruction with a second virtual privilege level selected from the plurality of virtual privileged levels and corresponding to the less privileged level, wherein associating the privileged instruction with the second virtual privilege level includes invalidating translation entries in those invalidation lists that correspond to the plurality of virtual privilege levels which are less privileged than or equal to the first virtual privilege level, or more privileged than the second virtual privilege level; and executing, by the hypervisor program, the privileged instruction associated with the second virtual privilege level in the operating system.

8. The method according to claim 7, wherein associating the privileged instruction with the second virtual privilege level corresponding to the less privileged level further comprises maintaining subassemblies corresponding to the plurality of virtual privilege levels, wherein each of the subassemblies is configured to group available translation entries that are associated with a virtual address space accessible by a corresponding one of the plurality of virtual privilege levels;

for a specific invalidation list and a specific subassembly that correspond to the second virtual privilege level, restricting the specific invalidation list to the specific subassembly in choosing an available translation entry from the specific subassembly; and invalidating translation entries in those subassemblies that correspond to any of the plurality of virtual privilege levels that are less privileged than or equal to the first virtual privilege level, or more privileged than the second virtual privilege level.

9. The method according to claim 7, wherein associating the privileged instruction with the second virtual privilege level corresponding to the less privileged level further comprises for a second virtual machine managed by the hypervisor program and is configured to access a virtual address space that is more privileged than or equal to the first virtual privilege level, assigning a local number associated with the second virtual machine to a current logical space register supported by the processor for translating the virtual address space; and invalidating translation entries that previously utilize a synonym of the local number.

10. The method according to claim 7, wherein associating the privileged instruction with the second virtual privilege level corresponding to the less privileged level further comprises:

for a second virtual machine managed by the hypervisor program and is configured to access a virtual logical space that is less privileged than or equal to the second virtual privilege level, assigning a global number to a current logical space register supported by the processor for translating the virtual logical space, wherein the global number is common to all virtual machines managed by the hypervisor program but different than all local numbers associated with the virtual machines; and invalidating translation entries that previously utilize the global number when the hypervisor program switches from running the first virtual machine to the second virtual machine.

11. The method according to claim 10, wherein associating the privileged instruction with the second virtual privilege level corresponding to the less privileged level further comprises invalidating translation entries, in a logical cache that are used by the processor, corresponding to the invalidated translation entries that previously utilize the global number.

12. The method according to claim 7, wherein associating the privileged instruction with the second virtual privilege level corresponding to the less privileged level further comprises for a second virtual machine managed by the hypervisor program and is configured to access a virtual logical space having a specific virtual privilege level, assigning a local number associated with the second virtual machine, the virtual logical space, and the specific virtual privilege level to a current logical space register for translating the virtual logical space;

upon a change of the second virtual machine, the virtual logical space, or the specific virtual privilege level by the hypervisor program, assigning a new local number to the current logical space register; and invalidating translation entries that previously utilize a synonym of the new local number.

13. A system for CPU virtualization, comprising:

a processor having a privileged mode and a non-privileged mode;

a memory coupled with the processor for storing virtual logical spaces;

a hypervisor program running in the privileged mode of the processor, wherein the hypervisor program is configured to maintain a plurality of virtual privilege levels that are operable in the non-privileged mode of the processor and are organized into a hierarchy of levels, and maintain invalidation lists corresponding to the plurality of virtual privilege levels, each of the invalidation lists being configured to store translation entries that are associated with a virtual address space corresponding to one of the plurality of virtual privilege levels; and a first application program running in the non-privileged mode of the processor, wherein the first application program is based on an operating system within a first virtual machine supported by the hypervisor program, and the first application program is associated with a first virtual privilege level selected from the plurality of virtual privilege levels, wherein in response to a call from the operating system relating to a request by the first application program to the operating system to execute a privileged instruction, the hypervisor program associates the privileged instruction with a second virtual privilege level selected from the plurality of virtual privileged levels, wherein when the second virtual privilege level is a more privileged level than the first virtual privilege level, associating the privileged instruction with the second virtual privilege level includes removing the translation entries in those invalidation lists that correspond to any of the plurality of virtual privilege levels that are not the second virtual privilege level, executes the privileged instruction associated with the second virtual privilege level in the operating system, and provides a processing of the privileged instruction with access to memory pages of one of the virtual address spaces corresponding to the second virtual privilege level.

14. The system according to claim 13, wherein when the second virtual privilege level is a less privileged level than the first virtual privilege level, the hypervisor program is configured to invalidate translation entries in those invalidation lists that correspond to any of the plurality of virtual privilege levels that are less privilege than or equal to the first virtual privilege level, or more privileged than the second virtual privilege level.

15. The system according to claim 13, wherein the hypervisor program is configured to manage a second virtual machine that is configured to access one of the virtual address spaces that is more privileged than or equal to the first virtual privilege level, and assign a local number associated with the second virtual machine to a current logical space register supported by the processor for translating the one of the virtual address spaces.

* * * * *